United States Patent Office 3,547,747
Patented Dec. 15, 1970

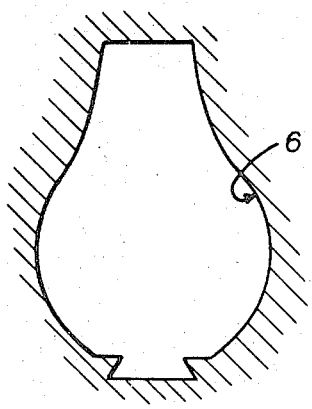
FIG. 1.
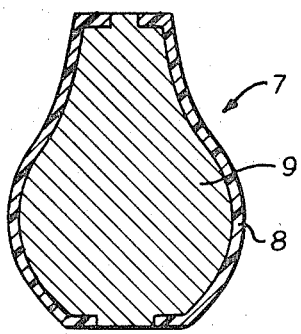
FIG. 2.
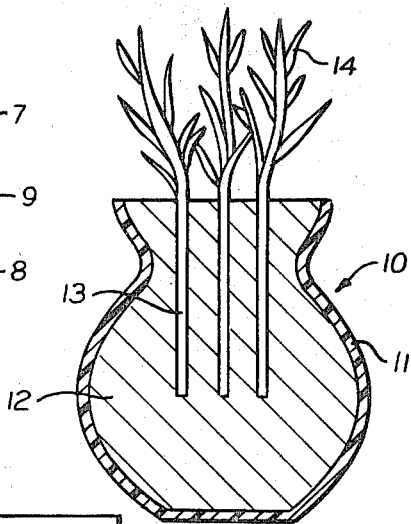
FIG. 3.
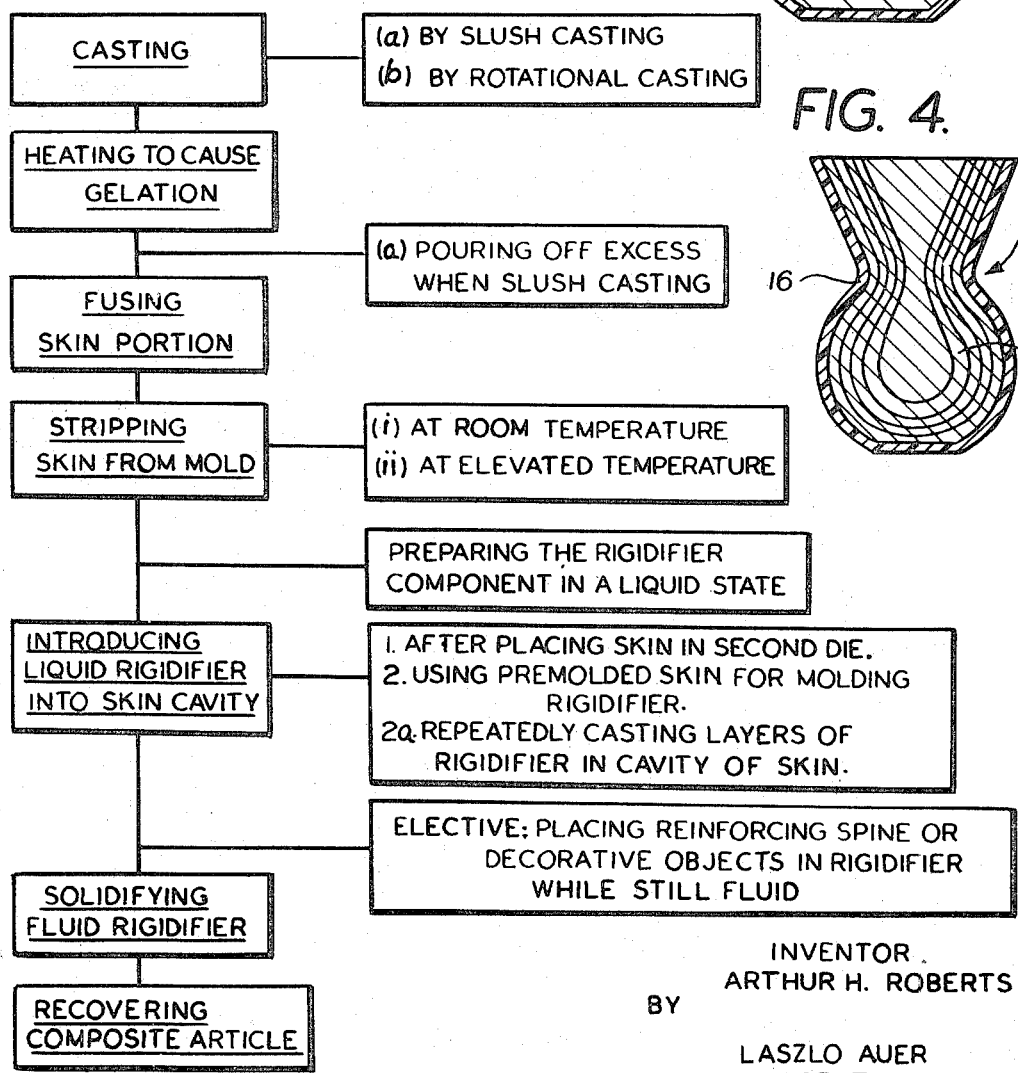
FIG. 5.
FIG. 4.
INVENTOR
ARTHUR H. ROBERTS
BY
LASZLO AUER
AGENT.

3,547,747
MOLDED PLASTICS ARTICLE WITH INTERIORS SOLIDLY FILLED AND METHOD OF THEIR MANUFACTURE
Arthur H. Roberts, 12 Lynnwood Drive, Westbury, N.Y. 11590
Continuation-in-part of applications Ser. No. 455,764, May 14, 1965, Ser. No. 475,989, July 30, 1965, Ser. No. 523,778, Jan. 28, 1966, and Ser. No. 525,667, Feb. 7, 1966, which are all continuation-in-part of application Ser. No. 22,002, Apr. 30, 1960. This application Oct. 1, 1968, Ser. No. 764,272
The portion of the term of the patent subsequent to Oct. 7, 1985, has been disclaimed
Int. Cl. B29c 13/00
U.S. Cl. 161—7
17 Claims

ABSTRACT OF THE DISCLOSURE

This invention relates to composite decorative articles of manufacture and their preparation. The articles are impact-resistant, three-dimensional and rigid. They are comprised of two essential elements: (1) a pliable hollow outer premolded plastics skin and (2) a rigid non-cellular plastic structural backing member solidified in the hollow interior of the plastics skin and essentially solidly filling said hollow interior. The structural backing member is also called "rigidifier" for brevity. Illustrative for the skin materials are plasticized polyvinylchloride compositions, polyethylene and rubber. Illustrative for the rigidifier are cements of various types, including plaster of paris and asphalt. A preferred skin is molded from a plastisol for instance by slush casting or rotational casting using a seamless mold. The plastisol is gelled, fused and removed from the mold. The rigid structural backing member is applied in a fluid state to the interior cavity of the premolded skin and solidified therein. The formation of the rigidifier in many cases does not require a supporting mold for the skin. By the favored method decorative articles with complicated undercuts can be prepared in a simple and economic manner.

CROSS REFERENCES TO RELATED APPLICATIONS

This application is a continuation-in-part of my copending applications Ser. No. 455,764, filed May 14, 1965 for "Impact Resistant Article and Method of Manufacture," now Pat. No. 3,405,026, Ser. No. 475,989, filed July 30, 1965 for "Molded Hollow Articles of Manufacture and Process for Their Preparation," now Pat. No. 3,414,456, Ser. No. 523,778, filed Jan. 28, 1966 for "Molded Articles of Manufacture Reinforced With Rigid Cellular Plastics and Process for Their Manufacture," now Pat. No. 3,419,455, and Ser. No. 525,667, filed Feb. 7, 1966 for "Molded Hollow Plastics Articles of Manufacture Rigidified With Rigid Resinous Compositions and Process for Their Manufacture," now Pat. No. 3,420,729. These applications were copending with and continuation-in-part of my application Ser. No. 22,002, filed Apr. 30, 1960 for "Method and Means for Manufacturing Various Articles and Articles Produced Thereby," since abandoned.

BACKGROUND OF THE INVENTION

Field of invention

The field of this invention is that of molded decorative articles of manufacture. Many of these articles were made earlier from ceramics or plastic of paris. These prior art articles are fragile. Others were made of solid plastics, like plastisols. Besides being expensive these all-plastics articles show the drawbacks of sensitivity to heat, heat distortion and cold flow at ambient temperatures.

Prior art

Whereas the broadest claims of my application Ser. No. 455,764 read on solidly filled articles, as originally filed, the scope of the claims therein are now limited to hollow articles of manufacture. This means that the skin component and the rigidifier jointly form a cavity, which does not apply to the instant application. Ser. No. 523,778 teaches articles of manufacture wherein the hollow interior of the skin component is filled with cellular composition. The nature of the instant invention, wherein the rigidifier is non-cellular, is obviously different from the articles having cellular rigidifiers. The utility of the articles varies from each other also.

Canadian Pat. 557,617, Schneider, describes a shoe last. The outer shell component is a plastisol type. The shell is hollow and the interior is filled in a certain manner with a cellulose acetobutyrate composition. The described composition is, however, softish, flexible and resilient, instead of being rigid.

Attention may be called to U.S. Pat. No. 2,065,316, Kimsel, wherein photographs are made three-dimensional by applying a photographic reproduction to celluloid, Molding this laminate with dies to obtain a relief half-head and optionally filling the back of the three-dimensional object with plaster of paris. The photographic paper component is absent from the herein claimed articles of manufacture and careful comparison of the prior disclosure with the instant one clearly shows patentable differences.

SUMMARY DESCRIPTION OF THE INVENTION

The articles of manufacture of this invention have two components. The outer component is a pliable hollow plastics "skin," which can also be called the "shell." The inner component is a rigid non-cellular plastic structural backing member which is solidified from a liquid state in the hollow interior of the plastic skin. The structural backing member essentially fills the hollow interior of the premolded plastic skin. The rigid structural backing member will be subsequently referred to as the "rigidifier."

In the art the expression "plastic" is used for materials capable of being molded or modeled, as clay or plaster. The expression "plaster" is used in the literature for plaster of paris. In this sense the expression "a rigid non-cellular plastic structural backing member" includes cements, such as plaster of paris, portland cement and bituminous products, as asphalts.

The skin is preset in its shape by a molding operation. It is formed from a plastic material, which is preferably pliable and resilient. Depending on the plastic material selected to form the skin, the molding operations may vary, in order to utilize the most advantageous method for the selected plastic. The outer surface of the skin readily receives coloring materials for decorating the composite article. The inner walls of the skin define an internal cavity accessible through an opening in the skin. The rigidifier component is in intimate contact with the inner walls of the preset skin and is in supporting relationship to the outer layer "skin." The rigidifier fills at least the major part of the interior cavity of the skin. The preferred rigidifiers are cements, which expression includes plaster of paris. Asphalt may also be used as rigidifier. The rigidifier is applied in a liquid state and solidifies within the interior cavity of the skin. The solidification of the rigidifier occurs at ambient temperatures. If asphalt is used, it is applied in a molten state and solidifies by cooling to room temperature. Depending on the thickness of the skin and the material used in forming it a second mold during the formation of the rigidifier may be advantageously eliminated. If a second mold is used, a split mold is of advantage. After solidification of the rigidifier the articles become rigid and in most cases could not be removed from one-piece molds.

The skin component of the composite articles of manufacture have a preferred wall thickness of about 1/64 of an inch to about 1/4 of an inch. Expressed in thousandths of an inch, this corresponds to a range of from about 15.625 mils to about 250 mils. The lower figure may be rounded to be 15 mils.

In one of the embodiments of this invention the rigidifier may be strengthened by a reinforcing spine component. The spine, where applied, is a third component and it may be used either within the entirety of the rigidifier or only in portions thereof.

SKIN COMPONENT

Plastisols illustrate an eminently suitable material to form the skin component of the articles of manufacture of this invention. They will be discussed further below in describing the preferred embodiment.

For the purposes of this invention it is meant that the skin materials are flexible, pliable and resilient in a relative manner in comparison with the rigidifier component of the articles of manufacture. The composite article itself is rigid and is resistant to impact. The rigidifier component rigidifies the flexible skins and improves resistance to cold flow or heat distortion. The skin materials on the other hand protect the rigidifier component from impact. The mutual improving effect between skin and rigidifier is unexpected and surprising and the effect obtained is in many cases synergistic. As a measure for flexibility or pliability I use hand pressure. If a skin material at 15 mils thickness can be deformed at least temporarily by hand pressure, the material is considered flexible and pliable.

Polyolefins, such as polyethylene and polypropylene are other illustrative examples for the production of the skin component of this invention. Polyethylene is made today of varying properties with the low pressure and high pressure polymerization processes. It is supplied with varying densities, molecular weights, flexibility and other characteristics. The types of polyethylene most suitable for this invention are pliable, flexible and show some degree of elasticity. Polyethylene is preferred in this invention over polypropylene since it is more easily formed into pliable and flexible skins. Polyethylene copolymers, such as ethylene-vinylacetate and ethylene-ethyl acrylate copolymers, offer improved flexibility and resilience. They are rubberlike and similar to elastomeric plastics. For the production of skins from polyethylene and polypropylene seamless dies are not satisfactory and two-piece dies are preferred, using blow molding or other methods. Polyallomers belong to this class of materials, as they are copolymers of ethylene and propylene.

The skin portion of the articles of manufacture of this invention may be formed of other materials such as vulcanized natural rubber or synthetic rubber. The skins may be formed according to known procedures of rubber technology. One of the methods useful in preparing skins from rubber is to use latex molding (latex casting) compounds, utilizing plaster of paris molds. The Vanderbilt News, vol. 27, No. 4, December 1961, page 72, deals with latex compounding which can be used to make skins for articles according to the present invention.

Other suitable plastic materials to form the skins of this invention are illustrated by methyl methacrylate polymer, ethyl cellulose, polycarbonates, polyurethane elastomers, flexible epoxy compounds, amongst others. Illustrative examples are given in my copending application, Ser. No. 475,989.

The preset molded skins can be prepared by various molding processes. The selected process depends on the selected plastic material and on the shape and size of the skin to be molded. For illustrative purposes a few examples are given. Casting such as slush casting or rotational casting: Plastisol, flexible polyester, flexible epoxy resins, methyl methacrylate, polycarbonates from solution, rubber from latex, etc. Injection molding or extrusion: Plastisol, polycarbonates, ethyl cellulose, polyethylene, cellulose acetate, cellulose acetobutyrate, etc. Vacuum forming: Polyethylene, polycarbonates, polyallomers, etc. Blow molding: Polycarbonates, polyethylene, polyallomers, ethyl cellulose, cellulose acetate, etc. Hot melt process: Ethyl cellulose, plastisol or other plasticized polyvinyl chloride compositions, polyethylene, etc.

Whether a one-piece, two-piece or multi-piece mold is required, depends on the selected skin material and, to some extent on the shape of the manufactured article. The molding process also influences the mold selection. Plastisol illustrates a skin forming material which permits the use of one-piece molds even if the skin has many undercuts in its shape. Methyl methacrylate illustrates a material which requires at least two-piece molds in most instances. Blow molding and vacuum forming are usually carried out in two-piece or multi-piece molds. One-piece molds form seamless molded shapes. Two-piece molds cause, in most cases, some seam formation. It may be necessary to eliminate these seams. Therefore, seamless molding is of advantage.

From the skin materials discussed above, polyethylene and polycarbonates, when blow molded, are used at a limited thickness.

RIGIDIFIER COMPONENT

The rigidifier portion of this invention is preferably a cement. Reference is made to Encyclopedia Britannica, 1960 edition, vol. 5, pages 107 to 115. According to the ancient meaning of the word, the expression "cement" was used to describe materials capable of adhering to and uniting into a cohesive mass, portions of substances not in themselves adhesive. Adhesive clay was used as one of the first materials for uniting stones, etc. Bitumen was also used for the same purpose. The use of burned gypsum and of lime dates back to the Egyptians. It should be noted that for the purposes of this invention bitumens, such as asphalts, are considered as cements.

Portland cement is made by burning a mixture of calcareous and argillaceous material to clinkering temperature, and grinding the resulting clinker. The mixture may be a natural one (such as the marls) or an artificial one (such as chalk or limestone) for the calcareous material, and clay or shale for the argillaceous material. The binding qualities of modern cements are very considerable, and it is possible to make good concrete from properly graded sand and ballast with the use of 1 part of cement to 12, or more, parts of aggregate; but as it is not always possible in practice to obtain a thorough distribution of cement throughout the mass, it is customary to use a larger proportion of cement; e.g., 1:3:5 parts of cement, sand and gravel; and for a better quality concrete 1 part of cement to 2 or 3 parts of sand, and 3 or 4 parts of gravel. A good cement mortar can be made from 1 part of cement to 4 or 5 parts of clean sharp sand, free from clay. If the mixture is too rich (e.g., equal parts of sand and cement) there is danger of cracks due to shrinkage, and apart from this the extra strength gained by using a greater proportion of cement than 1 to 3 of sand is so small that the additional cost is not justified.

The most essential part of the manufacture of portland cement is the complete chemical combination of certain constituents; viz, silica, alumina, and lime. The other constituents, particularly the iron oxide and alkalies, play their part but are subsidiary to the three main constituents. The composition of various portland cements as well as those of the so-called rapid-hardening cements and low-heat cements is well known.

Calcium sulphate cements are eminently suitable for the rigidifiers of this invention. This class includes all those cements which primarily depend on the hydration of calcium sulphate for their setting and hardening properties and includes plaster of paris, Keene's cement, Parian cement, etc. To obtain the suitable cement of this type, gypsum is calcined at comparatively low temperatures. To obtain plaster of paris, temperatures of about 205° C. are used at which temperature the gypsum loses three-quarters of its combined water. Keene's cement is made by calcination at 500° C., at which temperature the whole of the combined water is given off. The plaster-of-paris is mixed with a quantity of water sufficient to make it into a smooth paste. This quantity of water is quite insufficient to dissolve the whole of it, but it dissolves a small part and gives a super-saturated solution of calcium sulphate containing two mols of water in the molecule. The continuance of the reaction is well known in the art. Reference is made to Encyclopedia Britannica, vol. 5, page 114 of 1960 edition. Attention is called to the literature listed on page 115 at the end of the above recited article. First mentioned is the book of F. M. Lea and C. H. Desch, entitled "The Chemistry of Cement and Concrete," published by Edward Arnold Co., London, 1935, reprinted 1937.

Another suitable group of materials is the oxychloride cements. Whereas zinc oxychloride cements can be used, the most important species of this group are the magnesia oxychloride cements, which are also called Sorel cements.

Asphalt is another illustrative example of the rigidifier. Asphalt illustrates the alternative, where a unitary product is obtained, particularly in view of the good adhesion properties of asphalts to the skin materials of this invention. Asphalt is applied in molten liquid state and it solidifies by cooling. Asphalts include both natural and petroleum asphalts. Low-grade asphalts may be used in admixture with agents which reduce its possible cold flow characteristics and which improve the impact strength of the asphalt.

For the application of the rigidifier, which is applied in a fluid state, various methods are suitable. One of the favored methods of application is slush casting or slush molding. Rotational casting or molding can also be used, particularly where large numbers of the same product are manufactured in a given period. These casting methods are particularly adaptable for the application of the rigidifiers when the rigidifier is prepared in layers. Preparing the rigidifier in layers or in portions until the interior cavity of the skin is filled, has particular advantage by avoiding in most cases the necessity of using a second mold during the application of the rigidifier. The simplest method to apply the rigidifier is pouring the liquid into the interior cavity of the premolded skin component until the cavity is properly filled. Spraying may also be used for the application. Air atomization or airless spraying may be used, depending on the viscosity of the liquid rigidifier composition.

Adhesion of the cements to the premolded plastic shell component may be improved in some cases by adding a water dispersible adhesive to the mixing water of plaster of paris or portland cement. Adhesives can also be applied to the interior surface of the skin component prior to the application of the liquid rigidifier composition.

The articles of manufacture of this invention have improved resistance to impact, to heat distortion, to cold flow and the tensile strength is also improved, particularly noticeable on smaller objects. The articles have particular advantages where solid non-cellular construction is required. They can be easily decorated and yield attractive exterior surfaces. When used, as hardware handles, the surface has a nicer and softer "feel." Handles of various objects can be prepared with ease. Particular advantages are noticeable when metal parts are embedded in the rigidifier component during its setting. In a similar manner decorative plants, flowers and feathers can be embedded in the rigidifier to form decorative articles. As another use, preparation of door knobs can be mentioned.

DRAWING

FIG. 1 illustrates a vertical cross-section of a mold. 6 is a seamless mold suitable to form the skin component.

FIG. 2 illustrates the vertical cross-section of an object demonstrating the articles of manufacture herein claimed. 7 is the exterior surface of the object. 8 is the skin component and 9 is the rigid structural backing member, such as plaster of paris. The object could be a small lamp base or other art object filled with plaster of paris.

FIG. 3 illustrates a vertical cross-section of a planter or vase. 10 is the exterior surface of the article of manufacture. 11 is the plastic skin component. 12 is a cement rigidifier component, such as portland cement. 13 illustrates stems of artificial plants embedded in cement. 14 is the foliage of the artificial plants extending from the planter.

FIG. 4 demonstrates a vertical cross-section of a planter or vase 15. The skin component is 16 and the rigidifier component is 17. The rigidifier, as indicated in FIG. 4, is deposited in layers. Casting illustrates a method of deposition. Asphalt is a suitable rigidifier for the purposes of 15.

The rigidifiers given in FIGS. 2, 3, and 4, could replace each other, i.e. they are to a certain extent interchangeable. Concrete could also be used.

Reinforcing spine components may be incorporated into the rigidifier component. Metals, rigid foams and cardboard may be applied as reinforcing spines. Metals are used, e.g. in the form of layers, strips, rods, wires or wire meshes. Rigid foams can be used as preformed objects. Cardboard can be used, e.g. in the form of tubing. The reinforcing spines are placed into the cavity of the premolded skin portions prior to the application of the rigidifier in liquid form. As an alternative, they can be embedded into the rigidifier after it has been applied to the cavity of the premolded skins while the rigidifier composition is still in the liquid state.

FIG. 5 illustrates a Flow Sheet which will be discussed further below in connection with the preferred embodiment.

DESCRIPTION OF A PREFERRED EMBODIMENT

Plastisols illustrate an eminently suitable material to form the skin component of the articles of manufacture of this invention. Plastisols are well described in the literature, as e.g. in Modern Plastics 26, 78 (April 1949) by Perrone and Neuwirth. They are dispersions of finely divided polyvinyl resin powders in liquid organic plasticizers. The resins contain predominantly polyvinyl chloride with or without some other polymerized monomer. They are polymerized to a degree where they have very low solubility at room temperature. Therefore, instead of dissolving them, the plastisols contain the resins in a dispersed state; the dispersions are usually of creamy consistency at room temperature and are always fluid to a certain degree. A great variety of plasticizers can be used. Dioctyl phthalate is an example. Dioctyl adipate is another example, which frequently is used in admixture with dioctyl phthalate. Polyester plasticizers are also well known. The plastisols usually contain a stabilizer and may contain pigment, if so desired. For convenience and to achieve brevity, a few publications may be referred to, which all deal with plastisols, their formulation and application methods: (a) Geon Resin 121 in Plastisol Compounding, Service Bulletin PR-4, revised October 1958, B. F. Goodrich Chemical Company; 24 pages. (b) The Vanderbilt News, vol. 26, No. 3, June 1960; R. T. Vanderbilt Company, Inc., page 12. (c) Modern Plastics Encyclopedia issue for 1961, published in September 1960. Vinyl polymers and copolymers, pages 129 to 132. Plastisol Molding, pages 765 to 771. (d) Modern Plastics Encyclopedia 1965 (issued 1946); Vinyl Polymers and Copolymers, page 271; Plastisol Molding, page 690.

When molding plastisols, the material is heated to a gelling temperature and a gelled film or layer is formed which is very weak and cheesy, but which does not flow. Further heating is required to "fuse" the deposit, causing the resin to dissolve in the plasticizer and form a tough homogeneous resinous mass in which the powdered resin and liquid plasticizer have formed a single uniform phase. The fusion transforms the cheesy deposit or film to a tough leather-like homogeneous layer or skin.

With regard to temperatures required, these are well known in the art. They vary from composition to composition. They vary with time. There are, further, three types of temperatures involved: (1) oven temperature, (2) mold (die) temperature and (3) temperature of the plastisol. Gelation temperature may be accomplished by heating the oven from 150 to 600° F. and usually is between a plastisol temperature of 150 to 300° F. The necessary times vary with the temperature used. Fusion is accomplished by heating the gelled layer in ovens from about 350° F. to about 650° F. The achieved plastisol temperature for fusion should advantageously range from about 350° to 450° F.

The most useful molding methods for plastisol skins are illustrated by (a) slush molding, also called slush casting, and (b) rotational molding, also called rotational casting. The expression "casting" is used because the plastisols are applied in fluid state and for this reason the operation has similarity to metallurgical casting. Seamless dies (molds) are preferred for the intermediate products of this invention. They can be readily utilized, even when complicated undercuts exist in the molds, as the skins produced from the plastisols are flexible, elastic and have a "shape memory," i.e., they recover from their stretched position, obtained during removal, to the original molded shape.

When slush molding or slush casting is used, in the first step an excess of plastisol may be poured into the seamless mold. As the plastisol reaches gelation temperature, the layer adjacent to the metal wall of the mold gels, i.e., solidifies. The thickness of the gelled wall is determined by the duration of time the mold is exposed to the temperature of gelation. The excess plastisol is then removed by pouring off the liquid portion. Heating is then continued to complete the fusion and the molded skin is then removed or stripped from the mold. There are two methods known in slush molding: (i) One Pour Method, and (ii) Two Pour Method. Both are well known in the art and are applicable to make the skins of this invention from plastisols.

The rotational molding is another method of casting. The basic departure from the slush molding is that, instead of an excess of the liquid plastisol, a premeasured quantity of the fluid is used when charging the mold. This eliminates the need for removing any excess. The charged fluid plastisol is then distributed evenly in the mold by rotating the same on a rotational molding machine. After the plastisol is properly distributed, it is gelled by the application of heat and finally fused. The completed skin is then stripped and removed from the mold.

Whereas the casting by slush molding or rotational molding is preferred to form the skins from plastisols, other methods known in the art may also be followed to achieve the same purpose. Spraying illustrates such other methods.

Slush casting can be carried out with the so called One Pour Method or the Two Pour Method. In the slush casting of the inner layer frequently the "casting-drying" cycle is repeated more than twice.

If elevated temperatures are used in stripping the plastisol skin from the mold, a temperature of 140° F. illustrates a suitable temperature.

FIG. 5, the Flow Sheet, illustrates suitable processes of this invention.

Step 1: Casting fluid plastisol in a seamless mold; Alternative (a): by slush casting; Alternative (b): by rotational casting (molding);

Step 2: Heating the plastisol to a sufficient temperature and for a sufficient time to cause gelation of the plastisol adjacent to the mold; in Alternative (a) pouring off the excess liquid plastisol;

Step 3: Heating the mold and gelled plastisol to a temperature and for a time sufficient to fuse the gelled plastisol to a tough skin;

Step 4: Stripping the skin from the mold: Alternative (i) at room temperature, Alternative (ii) at suitable elevated temperature;

Step 5: Preparing the liquid cement composition which forms the rigidifier component upon solidification; Alternative (I): by the addition of water, in case of plaster of Paris or portland cement; Alternative (II): by heating, in the case of asphalt compositions;

Step 6: Introducing the liquid rigidifier component into the interior cavity of the premolded skin component; Alternative (1): after placing the skin in second mold; Alternative (2): using premolded skin for molding rigidifier; Alternative (2–a): using skin for molding rigidifier component while casting the liquid rigidifier composition in repeated layers into the interior cavity of the premolded skin component;

Step 7: Elective: Providing for reinforcing spine or incorporation of decorative objects (flowers, plants, feathers, etc.) while the rigidifier composition is still liquid;

Step 8: Solidifying the fluid rigidifier composition;

Step 9: Recovering composite article.

Plaster of paris is the favored embodiment for the rigidifier, followed by portland cement and then followed by asphalt compositions.

Whereas the solidification of the rigidifier is carried out in most cases at ambient temperatures, in some cases it may occur at elevated temperatures. The latter alternative is illustrated by rigidifiers liquefied by melting and applied in molten state.

I claim:

1. A composite, rigid, impact-resistant solid three-dimensional decorative article of manufacture comprising a pliable, hollow outer molded skin component of a premolded and preset shape formed of a resilient plastic material and having an outer surface for receiving coloring materials for decorating said article and having inner walls, said outer molded skin having an opening formed therein, said skin enclosing an internal cavity defined by said inner walls accessible through said opening and a rigid structural backing member component formed from a plastic material within said internal cavity and in intimate contact with the inner walls and engaged substantially with the entire extent thereof, said structural backing member solidly filling the internal cavity formed by the inner walls of the skin and being in supporting relationship to said outer skin, rigidly maintaining said outer skin in its preset shape.

2. A composite, rigid, impact-resistant solid three-dimensional decorative article of manufacture comprising a pliable, hollow outer molded skin component of a premolded and preset shape formed of a resilient thermoplastic material and having an outer surface for receiving coloring materials for decorating said article and having inner walls, said outer molded skin having an opening formed therein, said skin enclosing an internal cavity defined by said inner walls accessible through said opening and a rigid structural backing member component formed from a cement material within said internal cavity and in intimate contact with the inner walls and engaged substantially with the entire extent thereof, said structural backing member component solidly filling the internal cavity formed by the inner walls of the skin and being in supporting relationship to said outer skin, rigidly maintaining said outer skin in its preset shape.

3. The composite article of manufacture of claim 2 wherein the outer skin component has a thickness of from about 15 mils to about 250 mils, and said skin component having at least one undercut in its shape.

4. The composite article of manufacture of claim 2, wherein the rigid structural backing member component comprises plaster of paris.

5. The composite article of manufacture of claim 2, wherein the rigid structural backing member component comprises portland cement.

6. The composite article of manufacture of claim 2, wherein the rigid structural backing member component comprises an asphalt.

7. The composite article of manufacture of claim 2, wherein the molded outer skin component has a wall thickness of from about 15 mils to about 250 mils and comprises a member of the class consisting of (a) vinyl chloride in a polymerized and plasticized state, (b) ethylene in a polymerized state and (c) rubber.

8. The composite article of manufacture of claim 2, wherein the skin component comprises vinyl chloride in a polymerized and plasticized state.

9. The composite article of manufacture of claim 2, wherein there is present as an additional component a reinforcing spine embedded in the rigid structural backing member component.

10. The composite article of manufacture of claim 2, wherein there is present as an additional component a decorative object embedded in the rigid structural backing member component.

11. A method for forming a rigid, solid three-dimensional, impact-resistant, composite, decorative article of manufacture comprising the steps of casting a liquid plastisol material in a hollow, seamless mold, heating the cast layer of plastisol to gell the layer of plastisol next to the mold, heating the gelled layer of plastisol, while in the mold, to a temperature sufficient to fuse the gelled plastisol and to form an outer plastisol skin component having a premolded and preset shape defined by the shape of the mold and having an internal cavity with an access opening to said cavity, removing said skin from said mold, casting a solidifiable liquid cement material, capable of being transformed into a rigid solid, into the internal cavity of the preset outer skin component in a manner to fill substantially completely the internal cavity of the skin component, solidifying the said liquid cement material to a rigid backing member component in intimate contact with the inner surface of said skin, and recovering the molded decorative composition.

12. The method of claim 11, wherein the casting of the plastisol material is carried out in a manner to yield from about 15 mils to about 250 mils in wall thickness.

13. The method of claim 11, wherein the solidifiable liquid cement material is a member of the class consisting of (i) plaster of paris, (ii) portland cement, and (iii) an asphalt.

14. The process of claim 11, wherein the composite, decorative article of manufacture during the steps of applying and solidifying the cement material is in a supporting mold which can be taken apart to remove the completed article after the solidification step is completed.

15. The process of claim 11, wherein in an additional step a decorative object is embedded in the rigid structural backing member component during the solidification step.

16. The process of claim 11, wherein in an additional step a reinforcing spine is embedded in the rigid structural backing member component during the solidification step.

17. The process of claim 11, wherein the liquid cement material is applied in increments to form layers.

References Cited

UNITED STATES PATENTS

| | | | |
|---|---|---|---|
| 3,405,026 | 10/1968 | Roberts | 161—7 |
| 2,959,820 | 11/1960 | Miller et al. | 264—310 |
| 2,065,316 | 12/1936 | Kimsel | 156—59 |
| 3,071,817 | 1/1963 | Laporte | 264—302 |

FOREIGN PATENTS

| | | | |
|---|---|---|---|
| 910,631 | 11/1962 | Great Britain | 264—256 |

OTHER REFERENCES

Greenspun, "Slush Molding Vinyl Plastics," Plastics Engineering, October 1950, pages 102–104.

HAROLD ANSHER, Primary Examiner

J. C. GIL, Assistant Examiner

U.S. Cl. X.R.

161—160, 183, 231, 236; 264—45, 255, 256, 267, 302